United States Patent
Todd et al.

(10) Patent No.: US 10,452,295 B1
(45) Date of Patent: Oct. 22, 2019

(54) DATA ROUTING IN INFORMATION PROCESSING SYSTEM UTILIZING PERSISTENT MEMORY

(71) Applicant: EMC IP Holding Company LLC, Hopkinton, MA (US)

(72) Inventors: Stephen Todd, Shrewsbury, MA (US); Kenneth Durazzo, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 8 days.

(21) Appl. No.: 15/727,280

(22) Filed: Oct. 6, 2017

(51) Int. Cl.
*G06F 3/06* (2006.01)

(52) U.S. Cl.
CPC .......... *G06F 3/0635* (2013.01); *G06F 3/0604* (2013.01); *G06F 3/065* (2013.01); *G06F 3/0631* (2013.01); *G06F 3/0688* (2013.01)

(58) Field of Classification Search
CPC .... G06F 3/0635; G06F 3/0604; G06F 3/0631; G06F 3/0688
See application file for complete search history.

(56) References Cited

U.S. PATENT DOCUMENTS

| | | | | |
|---|---|---|---|---|
| 2008/0141067 A1* | 6/2008 | Nautiyal | ........ | G11C 29/84 714/6.12 |
| 2012/0096217 A1* | 4/2012 | Son | ........ | G06F 12/0246 711/103 |
| 2014/0195564 A1* | 7/2014 | Talagala | ........ | G06F 12/0804 707/802 |
| 2016/0034419 A1* | 2/2016 | Romem | ........ | G06F 15/167 709/203 |
| 2017/0277466 A1* | 9/2017 | Weld | ........ | G06F 11/0718 |
| 2018/0285009 A1* | 10/2018 | Guim Bernat | ........ | G06F 3/0604 |

* cited by examiner

*Primary Examiner* — Masud K Khan
(74) *Attorney, Agent, or Firm* — Ryan, Mason & Lewis, LLP

(57) ABSTRACT

In an information processing system comprising a set of computing devices wherein each computing device comprises a set of persistent memory modules resident in the computing device, a method generates at least one data structure that associates a given application program executing on the set of computing devices with at least one memory region of a given persistent memory module in a given one of the computing devices. The at least one data structure is utilized to route data between the given application program and the at least one memory region.

20 Claims, 10 Drawing Sheets

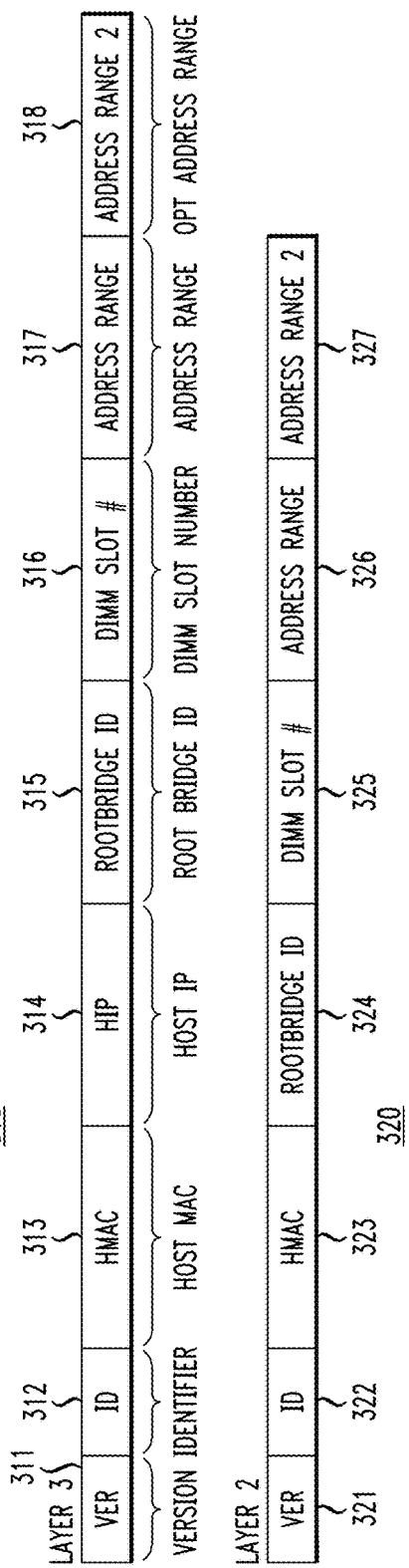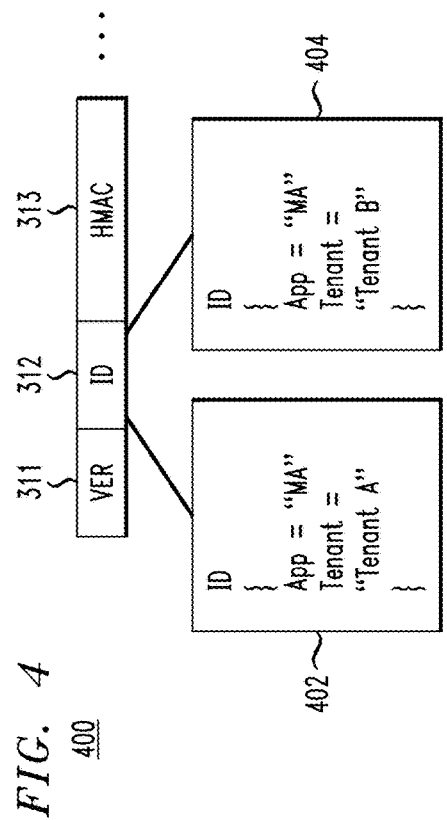

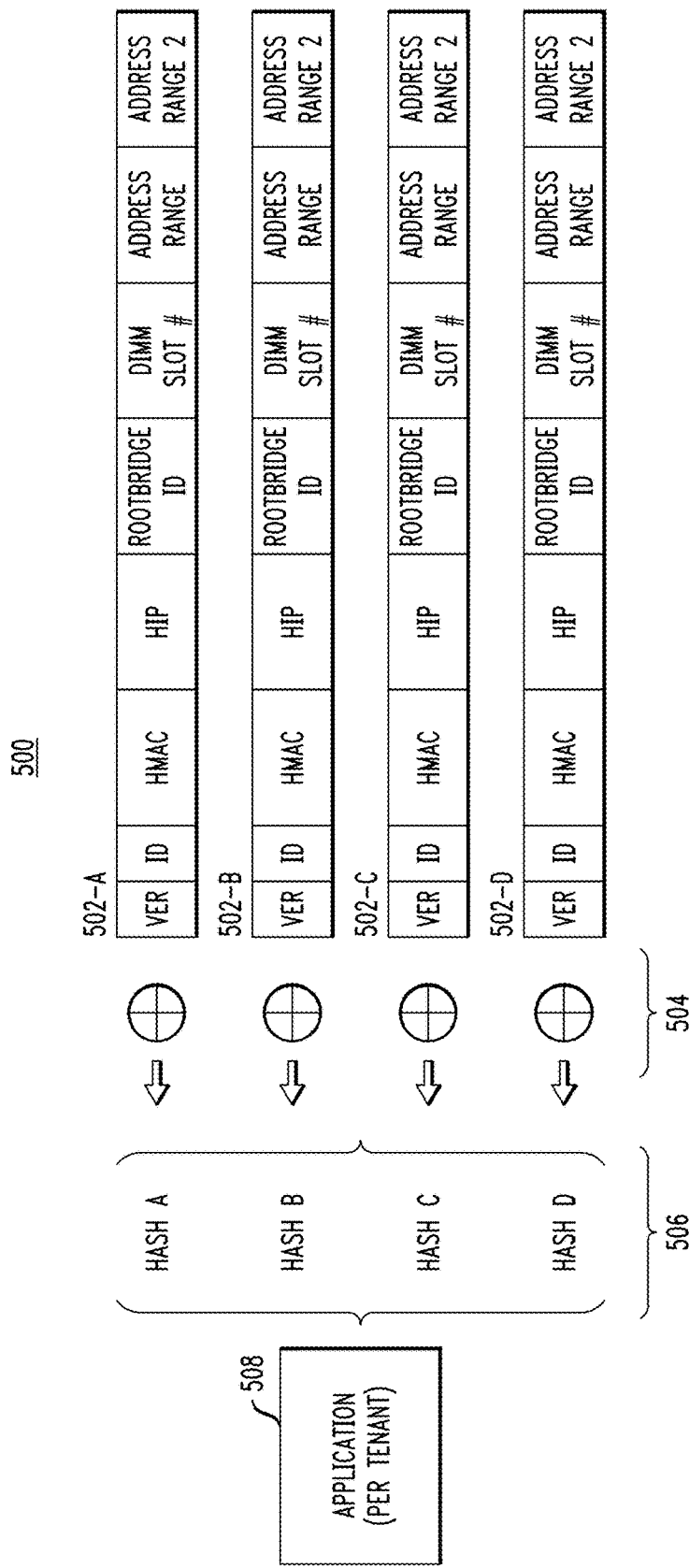

600

DATA ROUTING IN INFORMATION PROCESSING SYSTEM UTILIZING PERSISTENT MEMORY

FIELD

The field relates generally to information processing systems, and more particularly to techniques for routing data in information processing systems that utilize persistent memory.

BACKGROUND

By way of example, an information processing system may comprise a set of computing devices (e.g., servers) that host one or more application programs (applications) that utilize and generate data that is stored in a data storage system. In information processing systems that implement virtualization to provide a layer of abstraction over the physical server hardware, the applications are typically executed by one or more compute nodes in virtual processing elements or virtual processors such as, for example, containers or virtual machines. The input and output data associated with execution of an application is stored or persisted within the particular data storage system implemented by the information storage system.

Furthermore, the set of computing devices of the information processing system may be part of a data center in the form of a cloud-based computing environment which hosts applications for multiple tenants. The cloud-based computing environment may employ existing cloud services such as Platform-as-a-Service (PaaS) and Infrastructure-as-a-Service (IaaS) that enable efficient development and deployment of applications for application developers and owners.

As new applications are composed (e.g., microservices) or imposed (e.g., monolithic or legacy applications) via containers and onto a PaaS or IaaS, this creates challenges to the binding of applications to persistent data. Today's containers are distributed across available infrastructure components, and binding is carried out via centralized non-volatile primary storage. The binding is called out in manifests when the applications are composed. The current method of binding containers to primary storage is based upon existing data access methods (e.g., retrieve from primary storage such as storage arrays and load into memory resident on the host).

Thus, applications have typically stored their data between two tiers, i.e., a memory tier and a storage tier. However, persistent storage (referred to as PMEM) has begun to find use in some information processing systems. PMEM is accessed in a similar manner as volatile memory (e.g., dynamic random-access memory or DRAM) using processor load and store instructions; however, PMEM persists data in a non-volatile manner similar to a storage array.

SUMMARY

Embodiments of the invention provide techniques for routing data in information processing systems that utilize persistent memory.

For example, in one illustrative embodiment, a method comprises the following steps. In an information processing system comprising a set of computing devices wherein each computing device comprises a set of persistent memory modules resident in the computing device, the method generates at least one data structure that associates a given application program executing on the set of computing devices with at least one memory region of a given persistent memory module in a given one of the computing devices. The at least one data structure is utilized to route data between the given application program and the at least one memory region.

In further illustrative embodiments, a hash function is applied to the data structure to generate a hash value that is stored in a routing table for use in routing data between the given application program and the at least one memory region. For a given application program, multiple such hashed data structures may be generated and stored in the routing table to map each persistent memory location allocated to the given application program. The persistent memory which is resident on the computing device (e.g., host or server) is preferably utilized as primary data storage for the given application program. Advantageously, the association generated by the data structure forms a per tenant binding between the application program and the at least one memory region.

These and other features and advantages of the invention will become more readily apparent from the accompanying drawings and the following detailed description.

BRIEF DESCRIPTION OF THE DRAWINGS

FIG. 3 illustrates routing structures used to identify persistent memory locations, according to an illustrative embodiment.

FIG. 4 illustrates a process of embedding application and tenant identifiers into a routing structure, according to an illustrative embodiment.

FIG. 5 illustrates a process of application region mapping via hash values, according to an illustrative embodiment.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Examples of public clouds may include, but are not limited to, Amazon Web Services® (AWS), Google Compute Engine® (GCE), and Windows Azure® Services platforms. Thus, enterprises can choose to host their applications or services on private clouds, public clouds, and/or a combination of private and public clouds (hybrid clouds) with a vast array of computing resources attached to or otherwise a part of the infrastructure.

Figure 1:
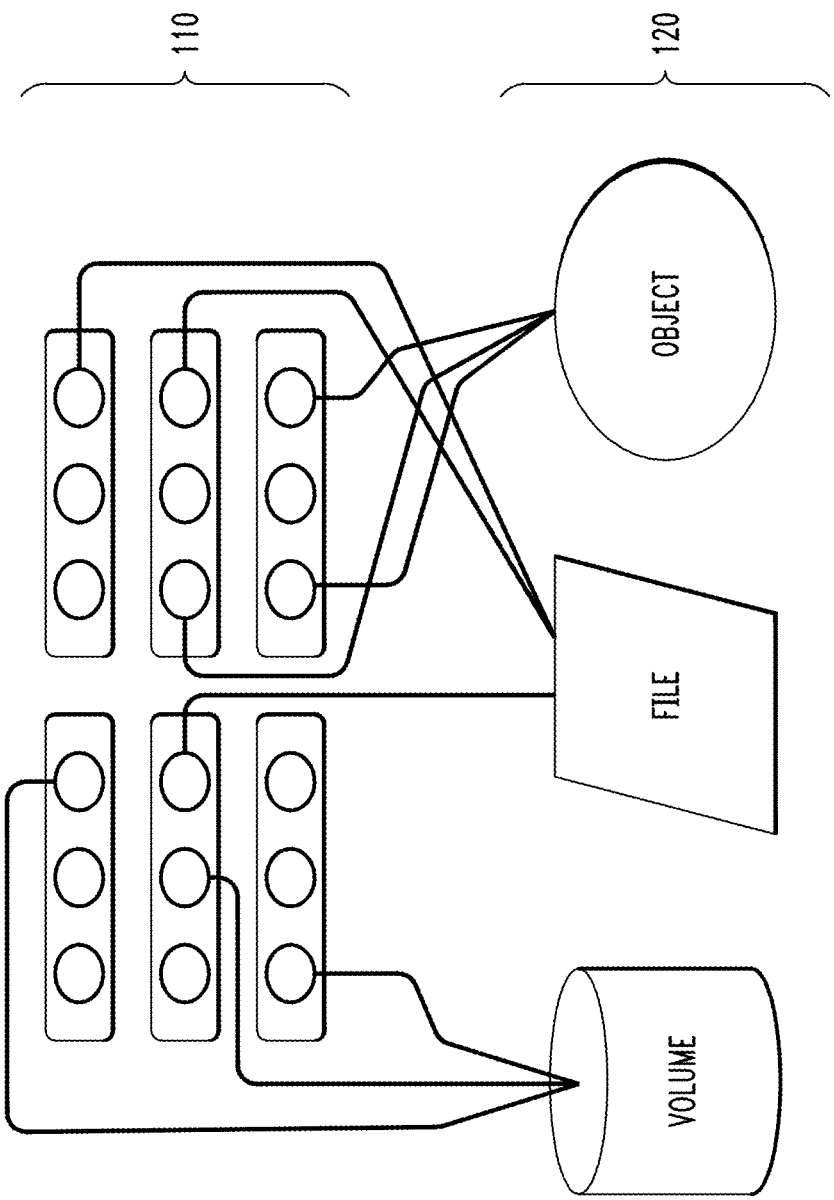
FIG. 1 illustrates a traditional centralized storage-to-DRAM model.

As mentioned above in the background section, existing data access methods are currently used to bind containers to primary storage. An example of this current binding approach is shown in FIG. 1. More particularly, FIG. 1 shows a traditional centralized storage-to-DRAM model for part of an information processing system 100 with DRAM 110 and primary storage 120.

The model depicted in FIG. 1 has several characteristics. First, centralization of persistent data creates a simple semantic binding construct. As shown, the lines represent binding between the memory (DRAM 110) and the primary storage 120 (volume (block)/file/object). Data is loaded into memory and the application processes the data. As containers move across the infrastructure, the same persistent binding is kept, allowing for simple orchestration. Object semantics are used not only for internal (e.g., to the data center) application binding but also for external (e.g., public cloud) data access. Orchestration is simple, as data is always centralized with an explicit binding in the block/file/object storage which may be implemented as one or more storage arrays. The storage arrays are typically collocated, although this is not a requirement.

However, it is realized herein that, persistent memory (PMEM) may be used to replace DRAM and further, because of its non-volatile persistent nature, PMEM allows for persistent storage inside each server (i.e., decentralized storage) that is byte addressable and thus can also serve as a replacement for primary data storage. As PMEM becomes the primary data store, any other storage tiers (block/file/object storage) will be relegated to archive storage. As this occurs, the architecture in FIG. 1 will be disrupted, and there will be less and less data sent to the (previously) primary data store. This will create several challenges, examples of which are described below.

First, with PMEM used as primary storage, data access semantics will no longer be block/file/object. Applications will increasingly be written to assume PMEM storage instead of the traditional centralized storage read/write paradigm. Further, data access semantics will change byte addressable pages. That is, applications will rely on load/store semantics to read/write data using byte-addressable access methods.

Still further, with PMEM as primary storage, data will be stored in decentralized servers, not centralized storage devices such as storage arrays. Data must be addressed in its physical location in server memory. This presents accessibility issues for containers that previously relied on loading data from a centralized storage system.

In addition, applications will no longer be able to directly access stored bytes via the use of universal resource identifiers or URIs (e.g., file/directory names). Applications will need new mechanisms to find the data they need to execute. Higher level application logic may be able to use URIs but the access to data will ultimately be PMEM-based.

Another challenge with PMEM as primary storage is that orchestration systems, which are not currently PMEM-aware, will either need to place containers physically proximate to the stored bytes or will at least need to know where the data is physically located during container placement.

Accessing data consistently across multi-cloud domains is also a challenge. That is, as data becomes increasingly distributed across multiple PMEM systems, managing a uniform data access methodology and understanding physical mappings across private and public domains is currently not possible.

Another challenge is that PMEM-based storage does not currently have the ability to be partitioned among multiple tenants so as to prevent unauthorized access on shared PMEM storage.

Lastly, PMEM-based storage presents a data protection challenge in that it currently has no ability to track where redundant copies are located and how those copies are being updated and/or synchronized.

Illustrative embodiments overcome the above and other drawbacks associated with replacing existing centralized primary storage with PMEM-based storage. More particularly, illustrative embodiments provide techniques for routing data in information processing systems that utilize PMEM as primary data storage.

Figure 2:
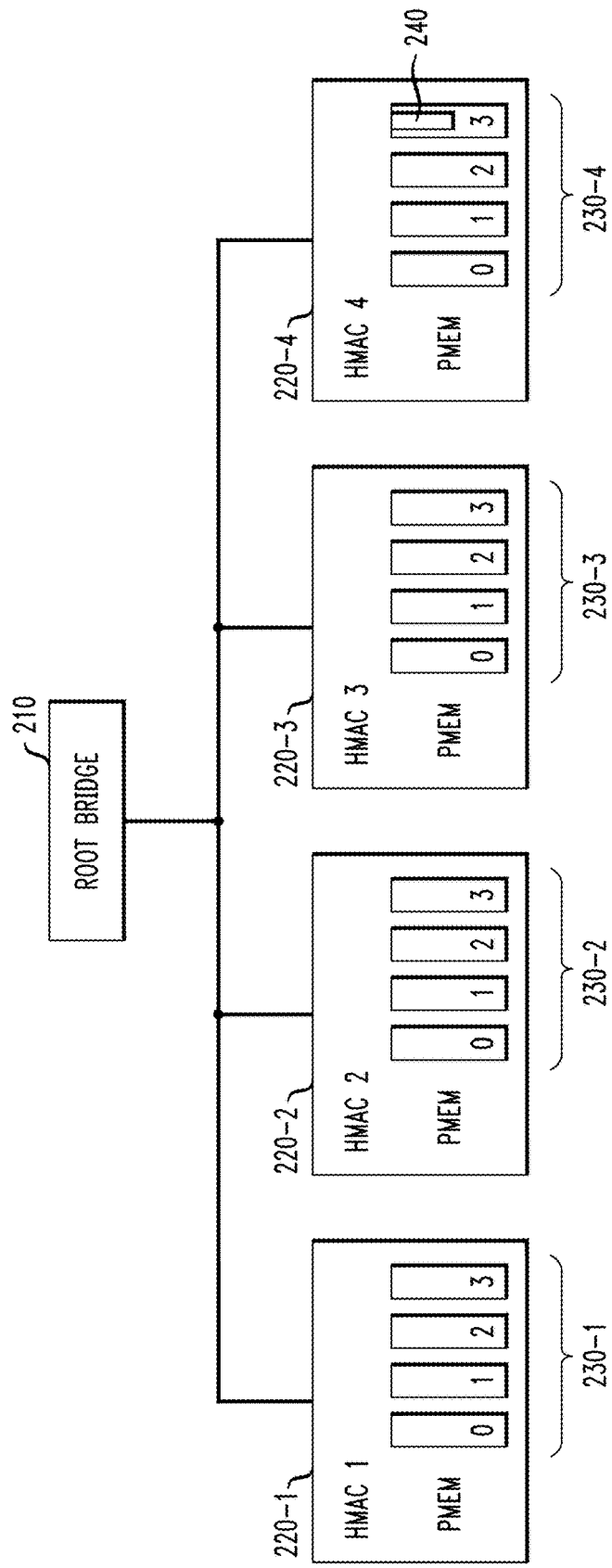
FIG. 2 illustrates a server configuration with persistent memory in accordance with which one or more illustrative embodiments may be implemented.

FIG. 2 illustrates a server configuration with PMEM serving as primary data storage in accordance with which one or more illustrative embodiments may be implemented. As shown, network-connected server configuration 200 comprises a root bridge 210 operatively coupling a set of servers 220-1, 220-2, 220-3 and 220-4. Of course, the number of servers may be more or less than the illustrative number shown in FIG. 2. Each server includes a set of dual inline memory module (DIMM) slots that each contain a PMEM module. Thus, as shown, servers 220-1, 220-2, 220-3 and 220-4 respectively include a set of DIMM slots 230-1, 230-2, 230-3 and 230-4 with PMEM installed. Again, while each set of DIMM slots is illustrated with four slots (0, 1, 2, and 3), there can be more or less slots in a given server configuration. Note that each server is designated with a host media access control (HMAC) address, i.e., server 220-1 as HMAC1, server 220-2 as HMAC2, server 220-3 as HMAC3, and server 220-4 as HMAC4. A HMAC address is typically associated with server's network interface controller (NIC) and is used to uniquely identify the server for data communication purposes.

In accordance with illustrative embodiments, routing structures (constructs) are used to identify any given memory region within the PMEM modules at any of the servers depicted in FIG. 2. By way of example only, such a routing structure can be used to identify memory region 240 highlighted in HMAC4:DIMM3 of FIG. 2. These networking constructs, which allow for the binding of source and destination addresses, can be used to bind and accurately map applications to their PMEM data locations.

FIG. 3 illustrates examples of two such routing structures that can be used to identify persistent memory locations, according to an illustrative embodiment. The two routing structures are illustrated in the context of the Open Systems Interconnection (OSI) model including the data-link layer (layer 2) and the network layer (layer 3). It is to be appreciated, however, that alternative embodiments may have routing structures that are different than the OSI examples shown in FIG. 3. It is to be further understood that the routing structures, in illustrative embodiments, serve as headers for packet content and may be appended to or otherwise associated with packet data structures.

As shown, layer 3 routing structure 310 comprises a Version field 311, an Identifier field 312, a Host MAC (HMAC) field 313, a Host Internet Protocol (IP) address field 314, a Root Bridge identifier (ID) field 315, a DIMM Slot Number field 316, an Address Range field 317 and a second (optional) Address Range field 318. Layer 2 routing structure 320 comprises a Version field 321, an Identifier field 322, a Host MAC (HMAC) field 323, a Root Bridge identifier (ID) field 324, a DIMM Slot Number field 325, an Address Range field 326 and a second (optional) Address Range field 327. It is to be appreciated that the routing structures shown in FIG. 3 may have additional fields that are not shown for the sake of simplicity of illustration and explanation. One of ordinary skill in the art will appreciate which additional fields that are not expressly shown may be part of the routing structure.

The Version field (311 and 321) specifies the IP version of the given network in which the servers are deployed. The Identifier field (312 and 322) specifies the entity or function with which corresponding packets are associated. The HMAC field (313 and 323) specifies the Host MAC address of a given server. The Host IP field (314) specifies the IP address of a given server (note that this field is present in the network layer routing structure 310 but not the data link layer routing structure 320). The Root Bridge ID field (315 and 324) specifies the identifier for the root bridge connecting a given set of servers. The DIMM Slot Number field (316 and 325) specifies the DIMM slot in which a given PMEM module is installed. The Address Range field (317 and 326) specifies the address range of a specific memory region on a given PMEM module. The (optional) Address Range 2 field (318 and 327) specifies the address range of another specific memory region on a given PMEM module.

One key aspect of an illustrative embodiment is the embedding of application and tenant information into the Identifier field (312 and 322). This approach allows for specific PMEM memory regions to be dedicated to tenants that are running specific applications. FIG. 4 illustrates a process of embedding application and tenant tags (identifiers) into a routing structure, according to an illustrative embodiment. More particularly, process 400 in FIG. 4 depicts how two different tenants 402 and 404 (e.g., Tenant A and Tenant B, respectively) running the same application (MarketingApp or MA) can be described within the Identifier field of a given routing structure (e.g., routing structure 310 in FIG. 3). It is to be appreciated that the data within the field 312 can be represented in any suitable data format (e.g., bits, ascii, etc.).

It is to be appreciated that the use of such routing structures (or more generally, data structures) described above results in many benefits for an information processing system that employs PMEM as primary data storage.

For example, illustrative embodiments depicted in and described in the context of FIG. 3 enable global data reachability at the data addressability layer. Furthermore, by building application/tenancy information into the routing structure, this global data reachability can be constrained to specify tenant ownership of specific persistent memory locations. Still further, the routing structures described in the context of FIG. 3 represent a uniform application/tenant/PMEM binding approach for identifying any PMEM memory region across any data center (as well as tying that region to a specific tenant and application).

In accordance with one or more illustrative embodiments, a routing structure shown in FIG. 3 (310 or 320), or a portion thereof, can be represented as a unique hash value. This hash value can be used as a "shorthand" way to track the mappings. It is to be understood that the mapping or binding created herein refers to the association created within the routing structure between a given application/tenant and a specific PMEM memory region location in a specific server. Therefore, a set of PMEM locations can be associated with a certain application/tenant, as further explained in the context of FIG. 5.

FIG. 5 illustrates a process 500 of application region mapping via hash values, according to an illustrative embodiment. More particularly, for each of a set of PMEM locations respectively represented by routing structures 502-A, 502-B, 502-C and 502-D, a hash function 504 is applied to the routing structure to generate a respective set of hash values 506, i.e., hash value A corresponds to routing structure 502-A, hash value B corresponds to routing structure 502-B, hash value C corresponds to routing structure 502-C, and hash value D corresponds to routing structure 502-D. These hash values are thus hashes of the PMEM location mappings for a given application for a given tenant. The given application and tenant are specified in the ID field of the routing structure as illustrated and previously described above in the context of FIG. 4.

It is to be appreciated that the hash function 504 applied to each routing structure can be a conventional hash function, and can be different for two or more of the routing structures. Also, in a similar manner as shown in process 500, routing structures that relate to the same application but different tenants can be mapped to the given application. Still further, routing structures for the same tenant but different applications can be mapped to the given tenant.

Advantageously, the routing structures according to illustrative embodiments provide the following important information about each PMEM memory region distributed across a set of servers in an information processing system: (i) a unique memory address (extended as needed for a given data set); (ii) location (how to reach the memory region); and (iii) identification (which host or server the memory region is in).

This information allows the creation of a routing table built as a distributed hash table (DHT), which allows the information processing system to pinpoint a particular host for a specific PMEM memory address space. Recall that the information processing system could be implemented as a public cloud, a private cloud, or some hybrid combination of both.

Figure 6:
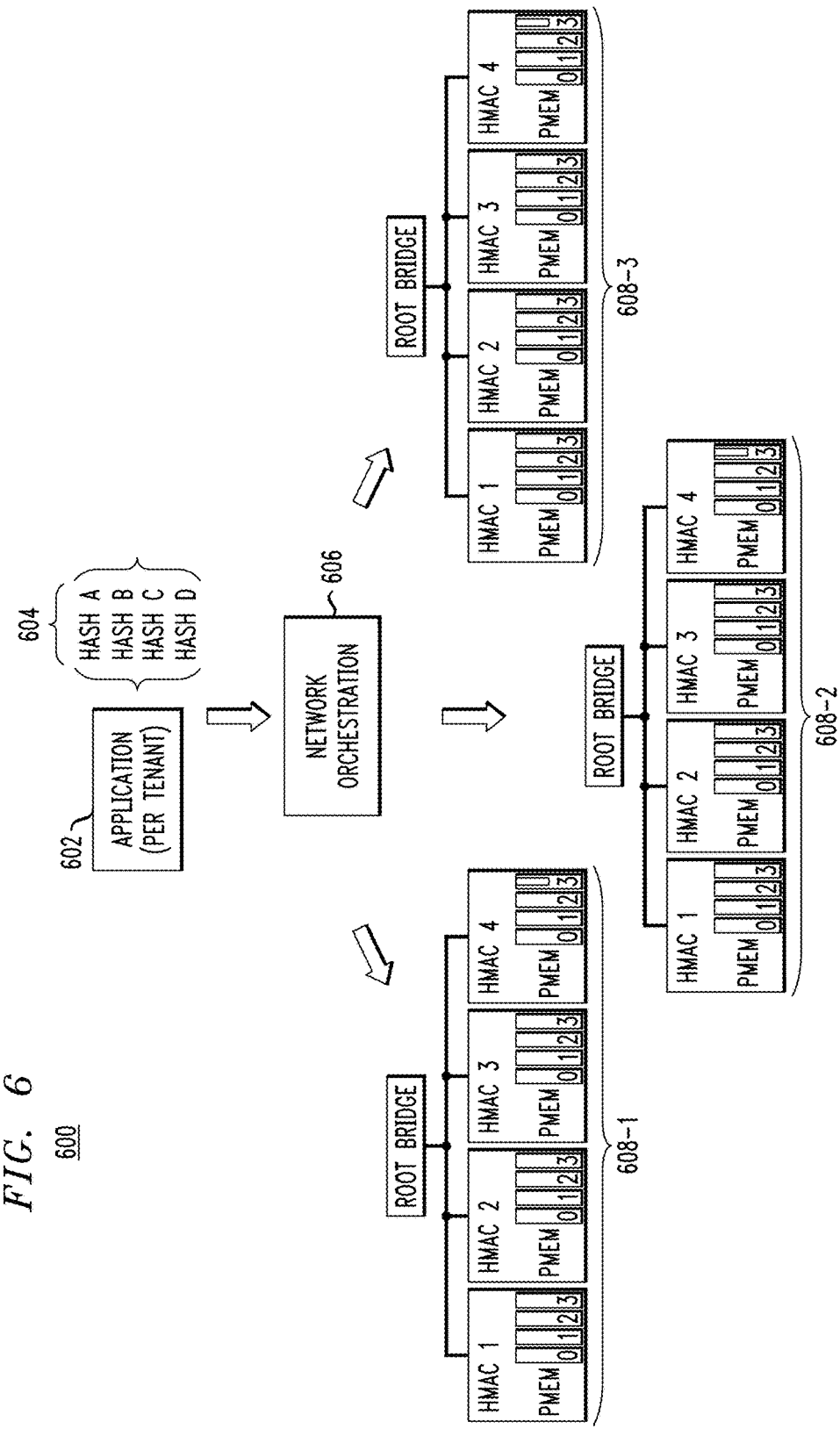
FIG. 6 illustrates a process of leveraging hash values to map applications to data centers, according to an illustrative embodiment.

When an application is scheduled to begin running, the orchestration software of the information processing system can access the hash values assigned to a given application and tenant. These hash values allow the orchestration software to know: (i) the network path; and (ii) the physical PMEM locations that have been allocated specifically to that application. FIG. 6 illustrates a process 600 of leveraging hash values to map applications to data centers, according to an illustrative embodiment. As shown, assume that for a given application and tenant 602 a set of hash values 604 are generated for a set of PMEM memory regions in which data is persisted for the given application/tenant. Process 600 in FIG. 6 highlights the ability of networking orchestration software 606 to choose the appropriate data center among a set of data centers 608-1, 608-2 and 608-3 based on the hash values 604. Note that each data center in FIG. 6 is illustratively represented by an information processing system 200 as shown in FIG. 2, although a given data center may have more or less servers with PMEM used for primary data storage.

By utilizing the above-described allocation of PMEM storage to a given application, containers can then be instantiated and mapped to their corresponding PMEM locations using a DHT. These containers can then begin to access persistent storage using byte-addressable semantics.

Changes to the routing structure, to the memory structure, concatenation/expansion of data, movement of data (e.g. from DIMM1 to DIMM4), etc., all cause a recalculation of the hash and hash table. Changes to the hash and the hash table can be trapped and trigger communication with management and orchestration (M&O) frameworks and/or applications/application management systems.

Figure 7:
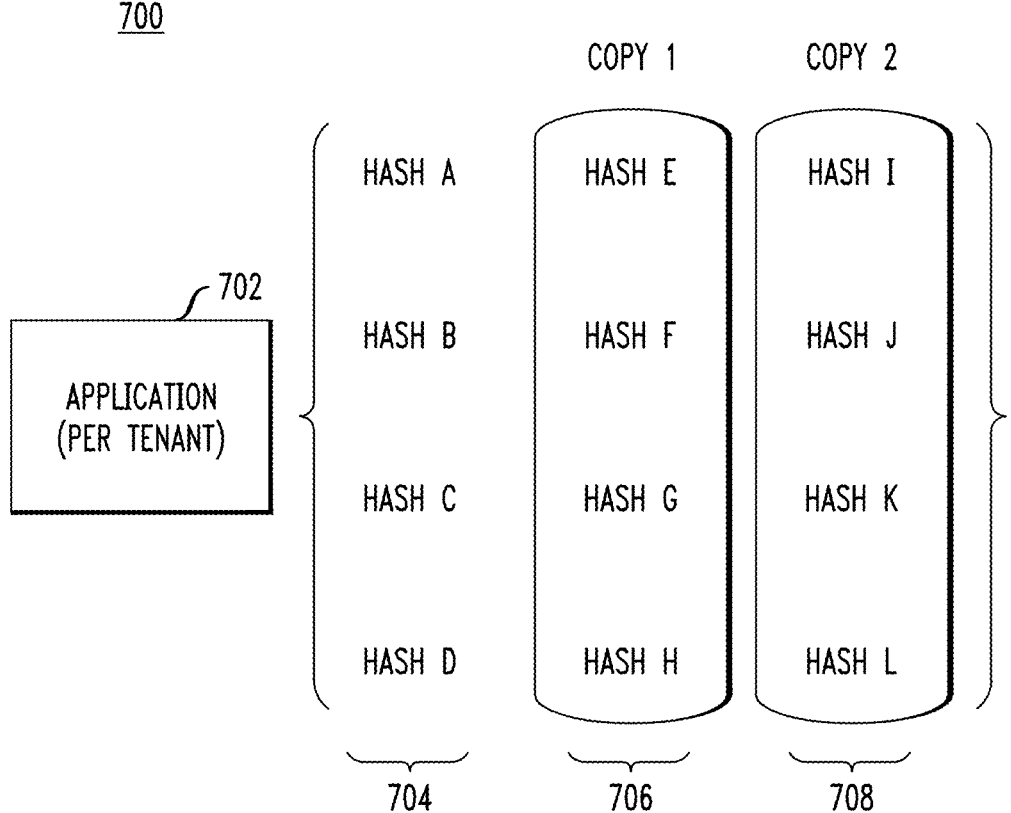
FIG. 7 illustrates a representation of persistent memory copies per application, according to an illustrative embodiment.

Illustrative embodiments also provide for representing PMEM data protection semantics. As applications can now be mapped to a list of PMEM areas through hashed routing structures as described herein, this list can be expanded to represent PMEM locations that contain copies or data protection areas for the application. These locations can be similarly represented using hashed forms of the routing structures. FIG. 7 illustrates a representation 700 of persistent memory copies per application, according to an illustrative embodiment. More particularly, FIG. 7 shows for a given application/tenant 702 for which a set of hash values 704 are generated as described herein, the addition of data copy representations into the solution, i.e., Copy 1 (706) and Copy 2 (708). These copy representations can also be augmented by descriptions of how the copies are maintained (e.g. synchronously, asynchronously, etc.).

Given the techniques described above, a variety of use cases leveraging such a unified PMEM location mapping and data routing approach will now be described.

Figure 8:
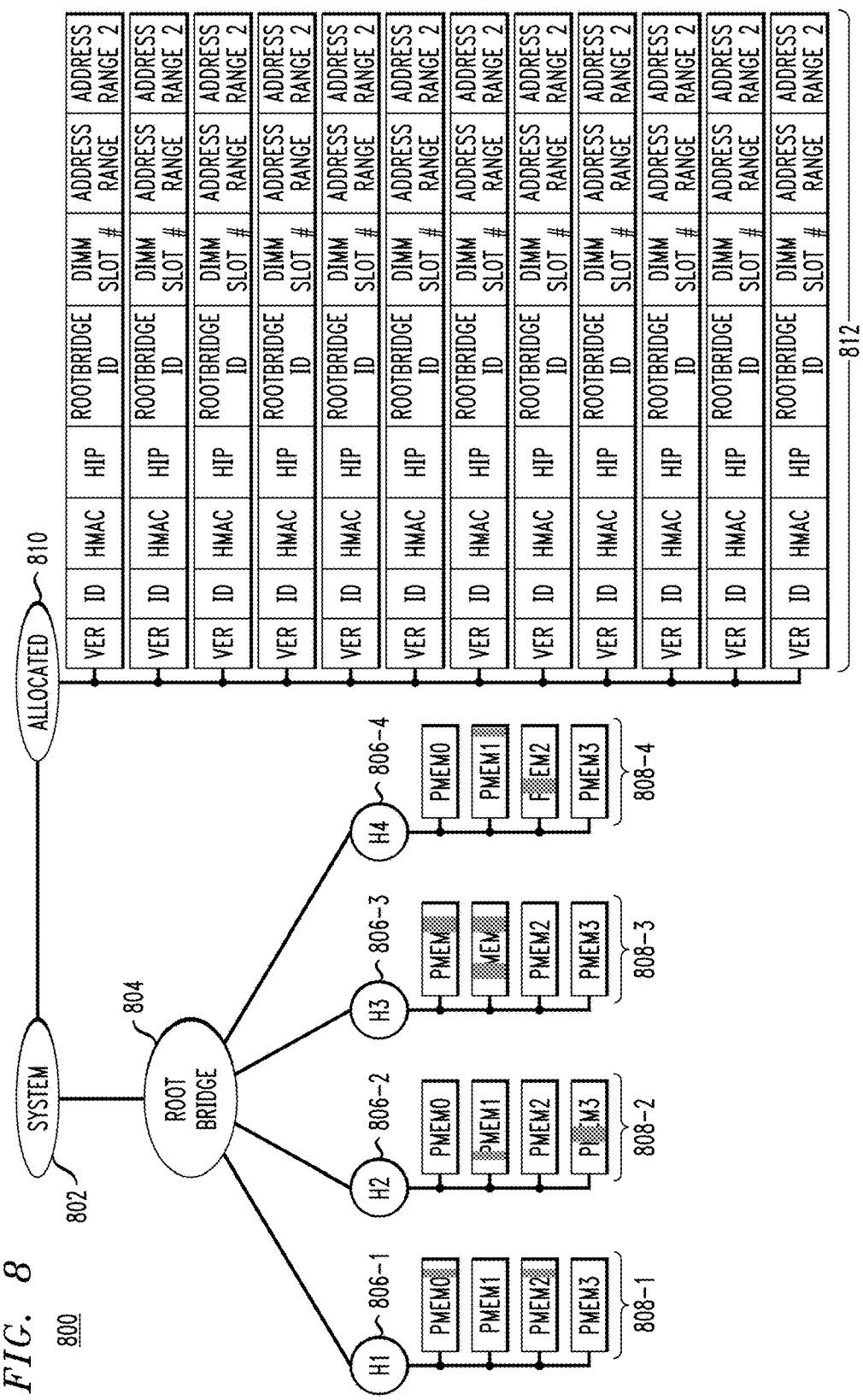
FIG. 8 illustrates a graph representation and allocation list, according to an illustrative embodiment.

FIG. 8 illustrates a use case 800 utilizing a graph representation and allocation list, according to an illustrative embodiment. As shown, a server configuration is modeled as a graph. Any appropriate network topology generation software tool can be used to model the server configuration as a graph. The graph in use case 800 depicts an information processing system 802 (or part thereof) with a root bridge 804 operatively coupling a set of servers or hosts 806-1, 806-2, 806-3 and 806-4 (H1, H2, H3 and H4, respectively), each having a set of four DIMM slots with PMEM installed. The sets of PMEM for H1, H2, H3 and H4 are depicted as 808-1, 808-2, 808-3 and 808-4, respectively. The graph also includes a PMEM allocation list that is represented by an allocated node 810 and a set of routing structures 812 (each similar to a routing structure shown in FIG. 3) that represent the mappings for each memory region of PMEM allocated to a given application/tenant. The routing structures in 812 correspond to the shaded sections in the PMEM portions (808-1, 808-2, 808-3 and 808-4) of the graph.

Accordingly, FIG. 8 highlights the routing and PMEM topology of FIG. 2 represented as a graph, and allocated portions of the PMEM within that graph are described in the allocation list. It is to be appreciated that each server can calculate what is locally allocated and that can be correlated and stored at the system level as described above. A corresponding free list (not expressly shown) can be tracked or the free list can be inferred from what has not been allocated. In one illustrative embodiment, the free list can be in the form of a free PMEM table which can be local to the server.

Figure 9:
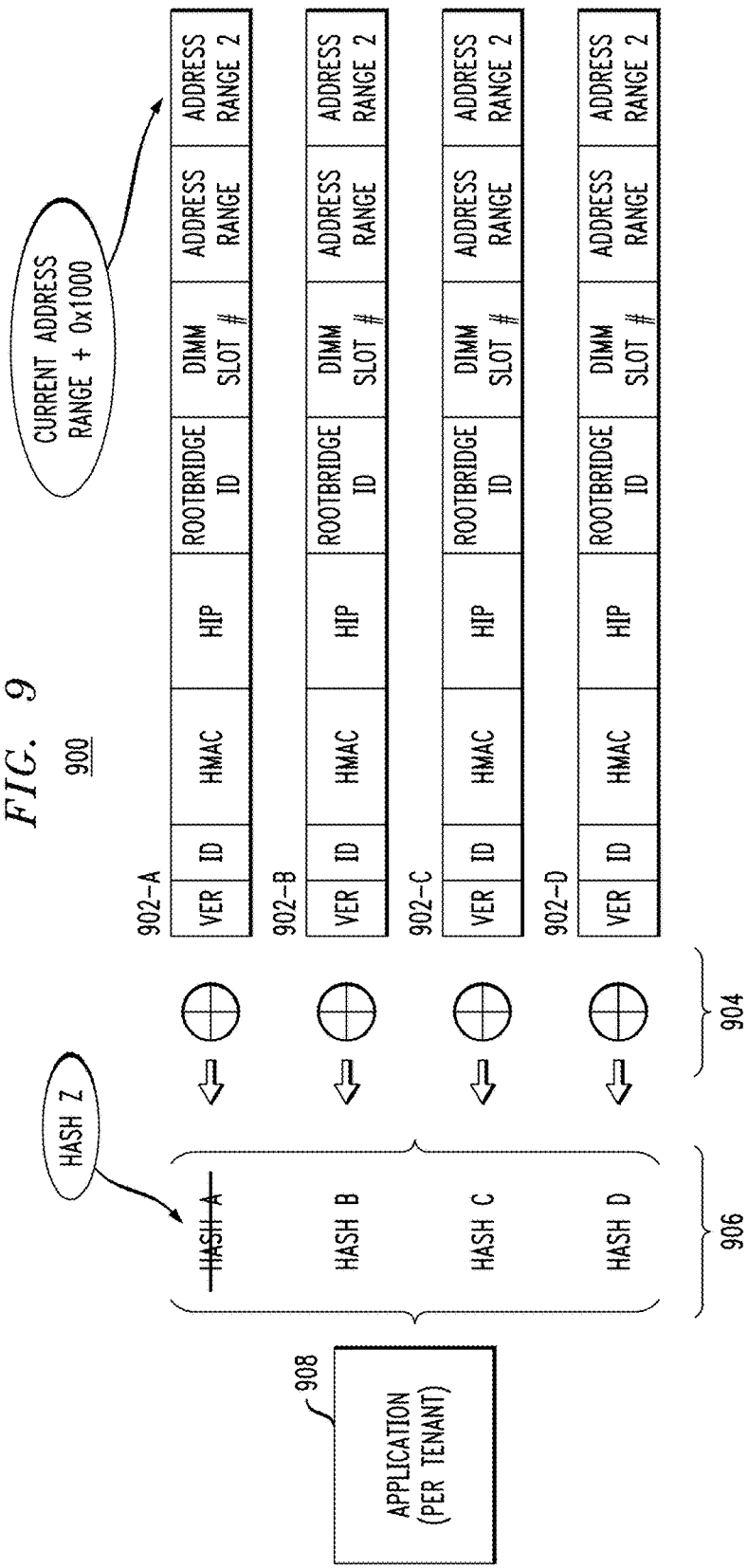
FIG. 9 illustrates a process of allocating additional persistent memory space to an application, according to an illustrative embodiment.

FIG. 9 illustrates a use case 900 of allocating additional persistent memory space to an application, according to an illustrative embodiment. In the event that an application is instantiated as a container, and should that container begin to allocate memory that is out of range (e.g., the application requires an additional 0x1000 bytes), the operating system triggers an expansion by consulting a local free PMEM table (e.g., and allocating more available memory). For example, if a large enough range of contiguous bytes is available within a server, the routing table can be updated by simply increasing the byte range (and therefore calculating a new hash).

More particularly, FIG. 9 illustrates a process where it is assumed that, for each of a set of PMEM locations respectively represented by routing structures 902-A, 902-B, 902-C and 902-D, a hash function 904 is applied to the routing structure to generate a respective set of hash values 906, i.e., hash value A corresponds to routing structure 902-A, hash value B corresponds to routing structure 902-B, hash value C corresponds to routing structure 902-C, and hash value D corresponds to routing structure 902-D. Then assume, as mentioned above, that more memory is allocated in the PMEM routing structure 902-A for the given application (e.g., additional 0x1000 bytes are specified in field 318 or 327 in FIG. 3). A new hash value (hash value Z) is calculated for the modified routing structure 902-A, and the corresponding routing table (DHT) is updated.

Furthermore, it is to be appreciated that there are a variety of reasons to move data in an information processing system, by way of example only: (i) an application's data may be moved from one cloud to another (e.g., from a public cloud of one cloud provider to a public cloud of another cloud provider); (ii) a cloud provider or enterprise may wish to upgrade their hardware; and/or (iii) PMEM fragmentation may require non-contiguous data to be better positioned.

In all of these cases, the free list of the target (note that target is the location where data is being moved to, while source is where data is moved from) can be analyzed for available space, and the data would then be copied to the target assuming there is adequate free space. The application hash table (formed from hashing the routing structures as described above) would be updated accordingly. This is illustrated in a use case 1000 in FIG. 10, according to an illustrative embodiment.

Figure 10:
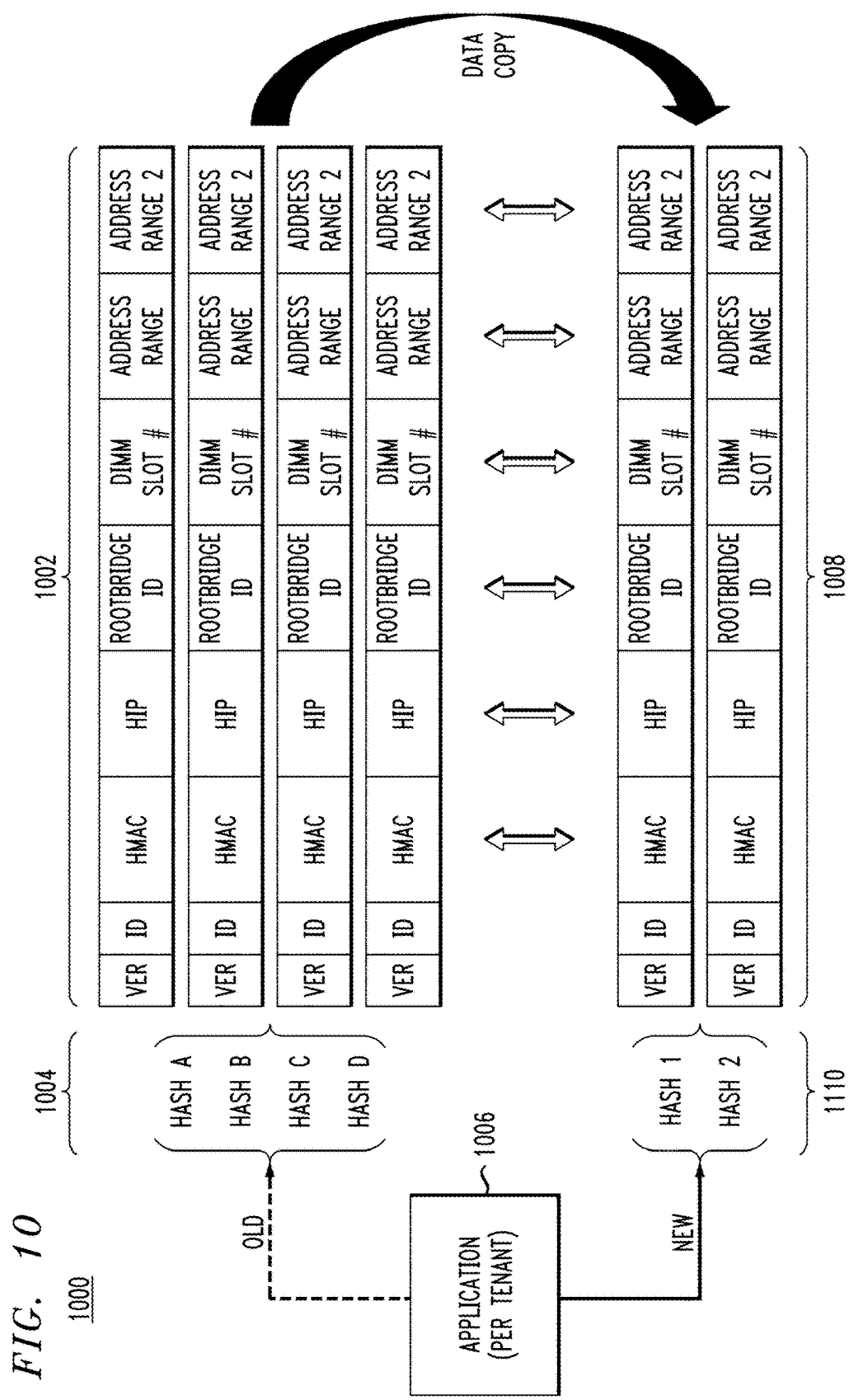
FIG. 10 illustrates a process of persistent memory movement of storage to a new location, according to an illustrative embodiment.

More particularly, FIG. 10 shows a set of routing structures 1002 being respectively hashed to generate a set of hash values 1004, thus creating a mapping (binding) that allows application 1006 to route data to appropriate PMEM locations. However, assume that the data associated with the memory regions specified in the set of routing structures 1002 are copied to a target location which is represented by a new set of routing structures 1008. These routing structures 1008 are then respectively hashed to generate a new set of hash values 1110 creating a new mapping (binding) allowing the application 1006 to route data to the new location.

At least portions of the information processing systems and processes shown in FIGS. 1-10 may be implemented using one or more processing platforms. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 11.

As is apparent from the above, one or more of the processing modules or other components of the information processing systems and processes shown in FIGS. 1-10 may each run on a computer, server, storage device or other processing platform element. A given such element may be viewed as an example of what is more generally referred to herein as a "processing device." An example of such a processing platform is processing platform 1100 shown in FIG. 11.

The processing platform 1100 in this embodiment comprises a plurality of processing devices, denoted 1102-1, 1102-2, 1102-3, . . . 1102-N, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 11:
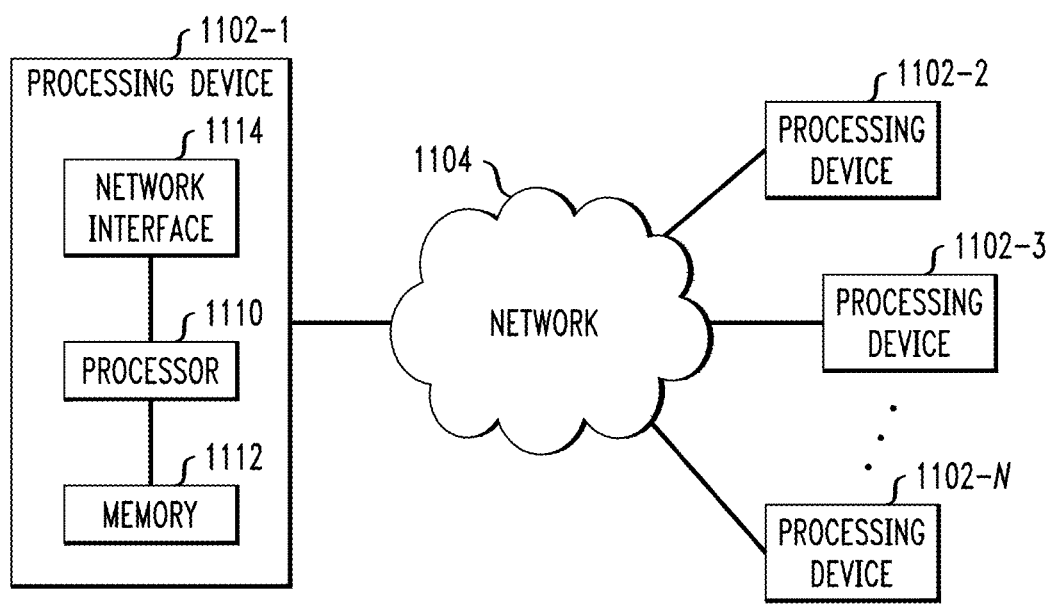
FIG. 11 illustrates a processing platform used to implement an information processing system that utilizes persistent memory as a primary data store, according to an illustrative embodiment.

Also included in the processing device 1102-1 of the example embodiment of FIG. 11 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of an information processing system(s), although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of an information processing system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the information processing systems and processes described herein. Such components can communicate with other elements of the system over any type of network or other communication media.

As indicated previously, in some embodiments, components of information processing systems and processes as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of information processing systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   in an information processing system comprising a set of host computing devices wherein each host computing device comprises a set of persistent memory modules resident in the host computing device, generating by a computing device of the information processing system at least one data structure that associates a given application program executing on the set of host computing devices with at least one memory region of a given persistent memory module in a given one of the host computing devices; and
   utilizing the at least one data structure to route data between the given application program and the at least one memory region;
   wherein the set of persistent memory modules in each host computing device function as primary data storage for the given application program.

2. The method of claim 1, wherein the at least one data structure also associates a given tenant of the information processing system with the at least one memory region of the given persistent memory module in the given one of the host computing devices.

3. The method of claim 2, wherein the association generated by the at least one data structure forms a per tenant binding between the application program and the at least one memory region.

4. The method of claim 2, wherein the at least one data structure further comprises:
   an identifier field for specifying the at least one application program and the given tenant;
   an identifier field for specifying the memory slot within the given host computing device in which the given persistent memory module is installed; and
   an address range field for specifying the memory address range of the at least one memory region of the given persistent memory module.

5. The method of claim 1, further comprising applying a hash function to the at least one data structure to form a hash value.

6. The method of claim 5, further comprising storing the hash value in a routing table for use in routing data between the given application program and the at least one memory region.

7. The method of claim 5, further comprising reapplying a hash function to the at least one data structure to form a new hash value when a change is made to the at least one data structure.

8. The method of claim 7, wherein the change to the at least one data structure comprises specifying an additional address range of the given persistent memory module.

9. The method of claim 1, wherein the step of utilizing the at least one data structure to route data between the given application program and the at least one memory region is performed by an orchestration system, wherein the orchestration system accesses the at least one data structure, when scheduling execution of the given application program via one or more virtual processing elements, to determine a routing path and location of the physical persistent memory allocated to the given application program.

10. The method of claim 9, wherein the one or more virtual processing elements are configured to access the given memory region of the given persistent memory module via byte-addressable semantics.

11. The method of claim 1, further comprising generating at least another data structure that associates the given application program executing on the set of host computing devices with at least one memory region of a given persistent memory module in a given one of the host computing devices in which a copy of data corresponding to the at least one given data structure is stored.

12. The method of claim 1, further comprising generating by a computing device of the information processing system at least another data structure that associates the given application program executing on the set of host computing devices with at least one memory region of a given persistent memory module in a given one of the host computing devices to which data corresponding to the at least one given data structure has been moved.

13. The method of claim 1, further comprising:
   generating by a computing device of the information processing system at least one of an allocated memory region list and a free memory region list for each of the persistent memory modules; and
   accessing by a computing device of the information processing system one of the lists to allocate one or more additional memory regions.

14. The method of claim 13, further comprising generating a graph representation of the set of host computing devices and the set of persistent memory modules resident in the host computing device that reflects at least one of the lists.

15. An apparatus comprising:
   in an information processing system comprising a set of host computing devices wherein each host computing device comprises a set of persistent memory modules resident in the host computing device;
   at least one processor of a computing device of the information processing system is configured to:
   generate at least one data structure that associates a given application program executing on the set of host computing devices with at least one memory region of a given persistent memory module in a given one of the host computing devices; and
   utilize the at least one data structure to route data between the given application program and the at least one memory region;
   wherein the set of persistent memory modules in each host computing device function as primary data storage for the given application program.

16. The apparatus of claim 15, wherein the at least one data structure also associates a given tenant of the information processing system with the at least one memory region of the given persistent memory module in the given one of the computing devices, and further wherein the association generated by the at least one data structure forms a per tenant binding between the application program and the at least one memory region.

17. The apparatus of claim 15, further comprising generating by a computing device of the information processing system at least another data structure that associates the given application program executing on the set of host computing devices with at least one memory region of a given persistent memory module in a given one of the host computing devices in which a copy of data corresponding to the at least one given data structure is either stored or moved.

18. An article of manufacture comprising a non-transitory processor-readable storage medium having stored therein program code of one or more software programs, wherein the program code when executed by at least one processor causes said at least one processor to:
   in an information processing system comprising a set of host computing devices wherein each host computing device comprises a set of persistent memory modules resident in the host computing device, generate by a computing device of the information processing system at least one data structure that associates a given application program executing on the set of host computing devices with at least one memory region of a given persistent memory module in a given one of the host computing devices; and
   utilize the at least one data structure to route data between the given application program and the at least one memory region;
   wherein the set of persistent memory modules in each computing device function as primary data storage for the given application program.

19. The article of manufacture of claim 18, wherein the at least one data structure also associates a given tenant of the information processing system with the at least one memory region of the given persistent memory module in the given one of the host computing devices, and further wherein the association generated by the at least one data structure forms a per tenant binding between the application program and the at least one memory region.

20. The article of manufacture of claim 18, further comprising generating by a computing device of the information processing system at least another data structure that associates the given application program executing on the set of host computing devices with at least one memory region of a given persistent memory module in a given one of the host computing devices in which a copy of data corresponding to the at least one given data structure is either stored or moved.

* * * * *

UNITED STATES PATENT AND TRADEMARK OFFICE
CERTIFICATE OF CORRECTION

PATENT NO.           : 10,452,295 B1
APPLICATION NO.      : 15/727280
DATED                : October 22, 2019
INVENTOR(S)          : Stephen Todd et al.

Page 1 of 1

It is certified that error appears in the above-identified patent and that said Letters Patent is hereby corrected as shown below:

In the Claims

Column 13, Claim 16, Line 5, before "computing devices" insert --host--

Signed and Sealed this
Third Day of December, 2019

Andrei Iancu
*Director of the United States Patent and Trademark Office*